United States Patent
Shilane

(10) Patent No.: US 10,831,370 B1
(45) Date of Patent: Nov. 10, 2020

(54) DEDUPLICATED AND COMPRESSED NON-VOLATILE MEMORY CACHE

(71) Applicant: EMC IP Holding Company LLC, Hopkinton, MA (US)

(72) Inventor: Philip Shilane, Newtown, PA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 86 days.

(21) Appl. No.: 15/396,302

(22) Filed: Dec. 30, 2016

(51) Int. Cl.
*G06F 3/06* (2006.01)

(52) U.S. Cl.
CPC .......... *G06F 3/0608* (2013.01); *G06F 3/0641* (2013.01); *G06F 3/0661* (2013.01); *G06F 3/0679* (2013.01)

(58) Field of Classification Search
CPC .... G06F 3/0608; G06F 3/0679; G06F 3/0641; G06F 3/0661; G06F 3/0664; G06F 3/0688; G06F 3/0638; G06F 12/0246; G06F 2212/222; G06F 2212/401; G06F 17/30153; G06F 17/30156; H04L 29/0604; H03M 7/30
See application file for complete search history.

(56) References Cited

U.S. PATENT DOCUMENTS

| | | | | |
|---|---|---|---|---|
| 8,095,756 B1* | 1/2012 | Somavarapu | ....... | G06F 11/1453 711/162 |
| 8,935,446 B1* | 1/2015 | Shilane | ....... | G06F 12/0871 710/62 |
| 9,367,557 B1* | 6/2016 | Lin | ....... | G06F 16/1744 |
| 9,552,384 B2* | 1/2017 | Narasimha | ....... | G06F 17/3033 |
| 2008/0005141 A1* | 1/2008 | Zheng | ....... | G06F 3/0608 |
| 2011/0119433 A1* | 5/2011 | Leussink | ....... | G06F 12/0246 711/103 |
| 2011/0208979 A1* | 8/2011 | Saarinehn | ....... | G06F 15/167 713/193 |
| 2011/0276781 A1* | 11/2011 | Sengupta | ....... | G06F 12/0862 711/216 |
| 2012/0017034 A1* | 1/2012 | Maheshwari | ....... | G06F 12/0866 711/103 |
| 2013/0276068 A1* | 10/2013 | Alwar | ....... | G06F 21/53 726/4 |
| 2014/0310476 A1* | 10/2014 | Kruus | ....... | G06F 12/0871 711/133 |
| 2016/0224588 A1* | 8/2016 | Harijono | ....... | G06F 17/30156 |
| 2017/0031831 A1* | 2/2017 | Bohra | ....... | G06F 12/0891 |
| 2017/0115883 A1* | 4/2017 | Muppalaneni | ....... | G06F 12/1009 |
| 2018/0060367 A1* | 3/2018 | Ioannou | ....... | G06F 17/30336 |

(Continued)

OTHER PUBLICATIONS

Microsoft press, "Microsoft Computer Dictionary 5th Edition" 2002, pp. 125 (Year: 2002).*

(Continued)

*Primary Examiner* — Michael Krofcheck
(74) *Attorney, Agent, or Firm* — Womble Bond Dickinson (US) LLP

(57) ABSTRACT

One embodiment is related to a method for applying deduplication and/or compression to data stored or to be stored at a non-volatile memory (NVM) cache comprising: identifying the NVM cache; determining whether deduplication or compression, or both, is to be applied to data stored or to be stored at the NVM cache; and applying either deduplication or compression, or both, to the data stored or to be stored at the NVM cache.

18 Claims, 8 Drawing Sheets

700

(56) References Cited

U.S. PATENT DOCUMENTS

2018/0067680 A1* 3/2018 Ohtsuji ............... G06F 3/0608
2018/0074723 A1* 3/2018 Delaney ............... G06F 3/0608
2018/0143994 A1* 5/2018 Ohtsuji ............... G06F 3/0608

OTHER PUBLICATIONS

Linktionary, http://www.linktionary.com/c/container.html, 2001 (Year: 2001).*
Techopedia, https://www.techopedia.com/definition/4252/container-java, Jun. 2016 (Year: 2016).*
Webopedia, https://www.webopedia.com/TERM/C/container.html, Nov. 2007 (Year: 2007).*

* cited by examiner

DEDUPLICATED AND COMPRESSED NON-VOLATILE MEMORY CACHE

FIELD OF THE INVENTION

Embodiments of the disclosure are related to electronic devices, and more particularly, to a method, apparatus, and system for managing the capacity of non-volatile memory.

BACKGROUND

New non-volatile memory (NVM) technologies are becoming available. One example product is Intel's Apache-Pass based on the 3D XPoint technology. NVM technologies offer a unique combination of properties: cost cheaper than dynamic random-access memory (DRAM), capacity larger than DRAM, nanosecond latency, byte addressable, endurance much greater than flash, and data persistence across power outages. These properties make NVM an attractive addition to servers for a variety of purposes. For example, NVM can be used to provide an extended caching area for servers such as storage systems since NVM is substantially faster to access than hard disk drives (HDDs) as well as solid state drives (SSDs).

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

New non-volatile memory (NVM) technologies are becoming available. One example product is Intel's Apache-Pass based on the 3D XPoint technology. NVM technologies offer a unique combination of properties: cost cheaper than dynamic random-access memory (DRAM), capacity larger than DRAM, nanosecond latency, byte addressable, endurance much greater than flash, and data persistence across power outages. These properties make new NVM an attractive addition to servers for a variety of purposes. For example, NVM can be used to provide an extended caching area for servers such as storage systems since NVM is substantially faster to access than hard disk drives (HDDs) as well as solid state drives (SSDs). Theses new types of NVM may be referred to as byte-addressable NVM.

NVM such as the ApachePass has longer latency times than conventional DRAM, but much shorter latency times than other common caching/tiering options. In particular, DRAM can generally be accessed (read or written) in 10s of nanoseconds, ApachePass in approximately 300 nanonseconds, Peripheral Component Interconnect (PCI) connected flash devices in 10s of microseconds, SSDs in approximately 100 microseconds, and HDDs in approximately 10 milliseconds. Therefore, NVM such as ApachePass is an order of magnitude slower than DRAM (which is volatile), two orders of magnitude faster than PCI flash, three orders of magnitude faster than SSD, and five orders of magnitude faster than HDDs. Also, since NVM is both cheaper per gigabyte than DRAM and denser than DRAM, it can be added as a new caching layer in a computer server and other devices to speed up overall system throughput.

Figure 1:
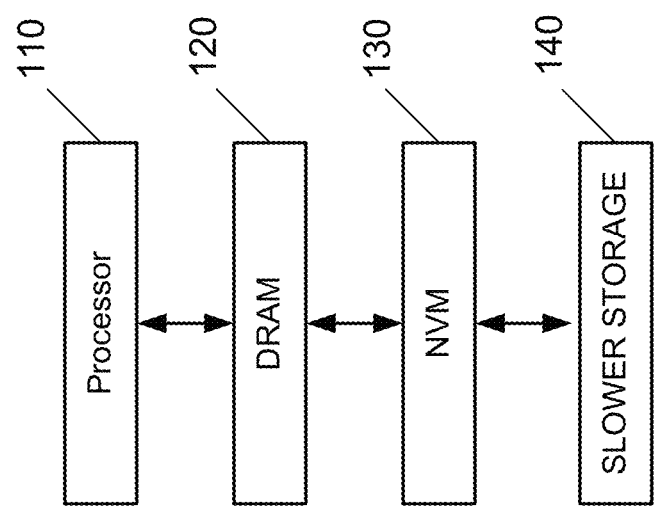
FIG. 1 is a block diagram illustrating an example environment in which embodiments of the disclosure may be practiced.

Referring to FIG. 1, a block diagram illustrating an example environment 100 in which embodiments of the disclosure may be practiced is shown. A processor 110 has direct access to DRAM 120. DRAM is fast, but is generally small in size due to its high cost. While NVM 130 can be larger than DRAM 120, it is still multiple orders of magnitude smaller and multiple orders of magnitude more expensive than HDDs (and other slower storage devices such as PCI flash, SSD, etc.), so NVM 130 can serve as a caching layer between DRAM 120 and slower storage devices 140, as shown in FIG. 1. By expanding the cache size of a server, system performance generally improves, or a system can service a greater number of client requests.

Cached content may include file system data or meta data, data structures for processes, database records, indexes for content stored either locally or remotely, web server content, or numerous other examples.

Embodiments of the disclosure relate to a method, apparatus, and system for applying deduplication and/or compression techniques to a NVM cache to expand its effective capacity. In particular, deduplication may refer to a process of identifying identical content in a system and replacing repeated versions with a reference to an earlier copy. For deduplication, the content size is often on the order of kilobytes, and the entire storage system can be searched for duplicates efficiently. Compression, on the other hand, identifies fine-grained redundant content at the granularity as small as a few bytes. Typically the range over which such redundancies can be found is on the order of a few hundred kilobytes. Compression typically results in reducing the size of the input data.

Figure 2:
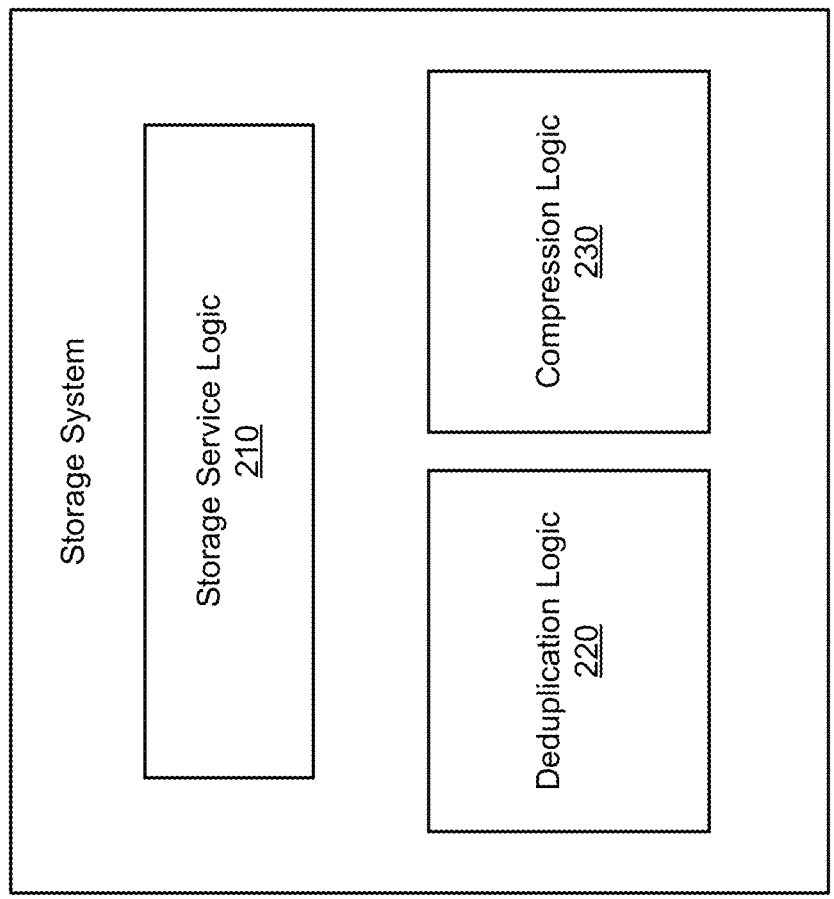
FIG. 2 is a block diagram illustrating an example storage system in which embodiments of the disclosure may be practiced.

Referring to FIG. 2, a block diagram illustrating an example storage system 200 in which embodiments of the disclosure may be practiced is shown. The storage system 200 may comprise a storage service logic 210 that coordinates and manages physical storage devices, a deduplication logic 220 that applies the deduplication technique to data stored in the storage system 200, and a compression logic 230 that applies the compression technique to data stored in the storage system 200. The storage service logic 210, deduplication logic 220, and compression logic 230 may be implemented in either hardware or a combination of hardware and software.

Figure 3:
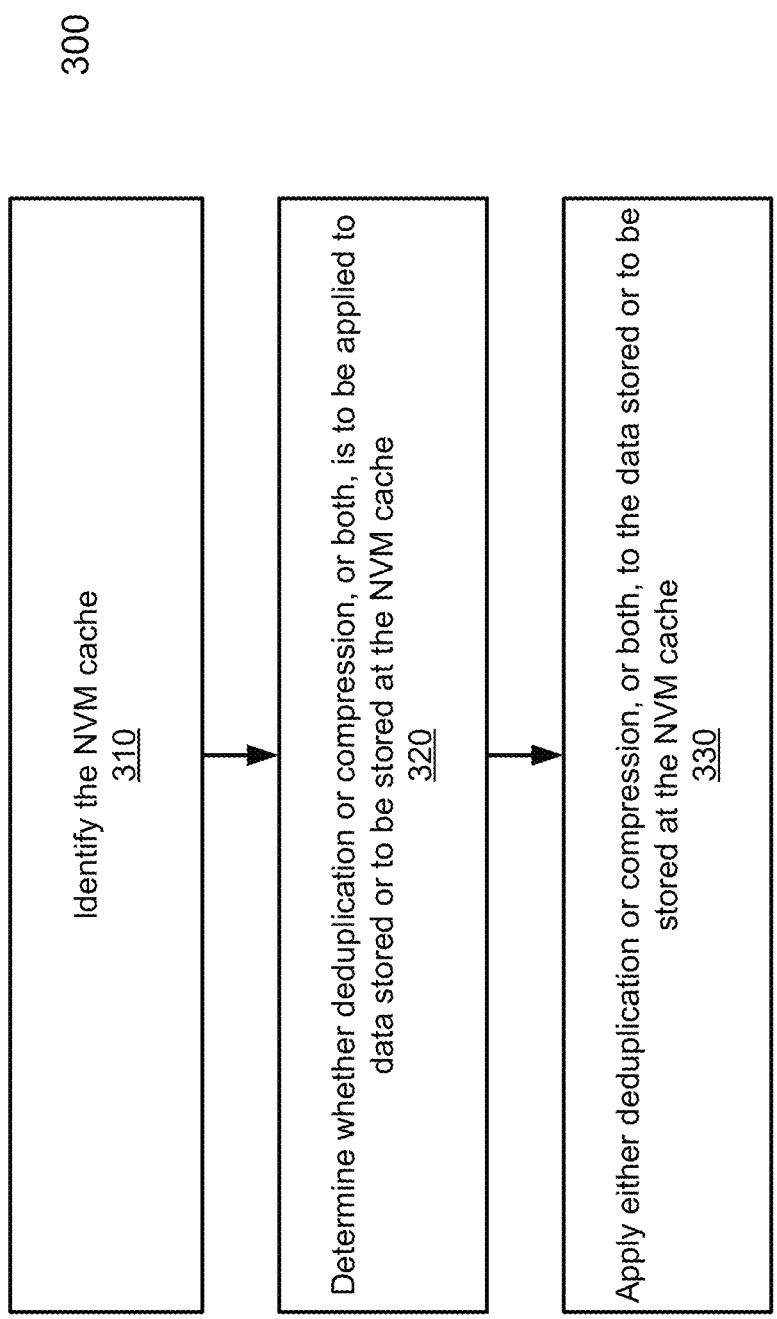
FIG. 3 is a flowchart illustrating an example method for applying deduplication and/or compression to data stored or to be stored at a NVM cache.

Referring to FIG. 3, a flowchart illustrating an example method 300 for applying deduplication and/or compression to data stored or to be stored at a NVM cache is shown. At block 310, the NVM cache may be identified. At block 320, whether deduplication or compression, or both, is to be applied to data stored or to be stored at the NVM cache may be determined. At block 330, either deduplication or compression, or both, may be applied to the data stored or to be stored at the NVM cache. It should be appreciated that although deduplication may itself be seen as a compression technique, hereinafter deduplication is treated as distinct from compression based on the fact that here deduplication refers to a technique that identifies large volumes/chunks of data—such as entire files or large sections of files—that are identical and stores only one copy of it.

Accordingly, deduplication is the process of identifying identical content, even if its client-provided key (Logical Block Address (LBA), <file handle, offset> pair, database record ID, etc.) differs. In one embodiment content can be compared byte-by-byte to confirm an exact match; in another embodiment hashing may be used to identify a chunk. Cryptographically strong hash functions such as SHA-1 or SHA-256 are generally sufficient and the associated probability of collision is lower than that for other causes of data loss. Deduplication for an NVM cache may work as follows. As a client inserts a new chunk of data (or meta data) into the NVM cache, a hash of the content may be calculated. Then an index may be checked to determine if the hash is already present (a matching hash indicates identical content). Table 1 below shows an index in DRAM that maps from a client key such as an LBA to the corresponding hash, and Table 2 below shows a second index that maps from the hash to the NVM location for each entry, along with other information in the index entries. The indexes may be stored in DRAM and/or NVM. If the index indicates that the hash is already present, then the chunk will not be added to NVM, but a new entry will be added to the index shown in Table 1 in the form of a <client key, hash> pair (a client key may be one of an LBA, a <file handle, offset> pair, a database record ID, etc.). If the hash is not present, then an entry is added to the index shown in Table 1 as well as the index shown in Table 2 that stores <hash, NVM loc.> pairs (NVM loc being the location inside the NVM). Deduplication can be applied inline as data is added to the cache, or if the system is under high computational demands, deduplication could be deferred to a later time when unprocessed content is read back from NVM and deduplicated.

TABLE 1

Client Key to Hash mapping

| Client Key 1 | Hash 1 |
| Client Key 2 | Hash 1 |
| ... | ... |
| Client Key n | Hash m |

TABLE 2

Hash to NVM location mapping

| Hash 1 | NVM Location 1 |
| Hash 2 | NVM Location 2 |
| ... | ... |
| Hash n | NVM Location n |

Figure 4:
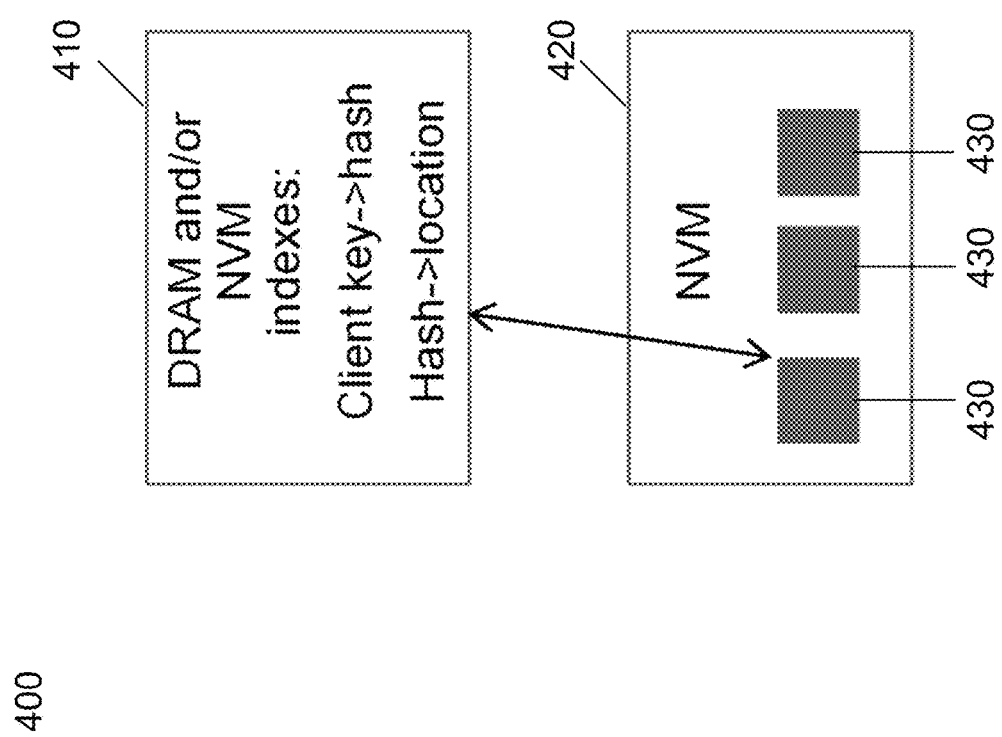
FIG. 4 is a block diagram illustrating various components according to embodiments of the disclosure.

Referring to FIG. 4, a block diagram 400 illustrating various components according to embodiments of the disclosure is shown. Two indexes 410 described above (the client key to hash "<client key, hash>" index and the hash to NVM location"<hash, NVM location>" index) may be stored in DRAM and/or NVM. Indexes stored in DRAM may need to be rebuilt after a system restart. It should be appreciated that the indexes may be stored in the NVM because endurance may be less of a concern with certain new NVM technologies than with conventional flash-based storage devices. Data chunks 430 may be stored in the NVM 420. Data chunks 430 may be either variable-sized or fixed-sized. Fixed-sized data chunks may also be referred to as data blocks. When a client inserts data, the data may be broken into chunks 430. For an incoming chunk, a hash of the chunk may be calculated. Then the <hash, NVM location> index may be checked to determine whether the hash already exists. If the <hash, NVM location> index indicates that the hash is already present, then the incoming chunk may not be actually written to the NVM; rather, a new entry may be added to the <client key, hash> index to link the new client key with the hash and thus with the already-stored identical version of the incoming chunk through the <hash, NVM location> index. If the hash is not present in the <hash, NVM location> index, the incoming chunk may be written to the NVM and a new entry each created for the chunk in both the <client key, hash> index and the <hash, NVM location> index. Deduplication may be applied inline as data is added to the cache, or if the system is under high computational demands, deduplication could be deferred to a later time when unprocessed content is read back from NVM and deduplicated.

When deduplication is applied, reading data begins with a check in the <client key, hash> index to determine the hash associated with the data chunk requested by the client as identified by the client key. Then the <hash, NVM location> index may be checked to determine the NVM location associated with the hash. Thereafter, the data associated with the client key may be read from the NVM location.

If a client deletes or overwrites a client key, the corresponding entry in the <client key, hash> index may be removed or updated, respectively. After a client deletes a client key, to decide whether the actual data chunk corresponding to the client key stored in the NVM may be removed, a determination may be made as to whether the data chunk corresponds to other extant client keys. If the hash of the data chunk is referenced by other extant, live client keys in the <client key, hash> index, the data chunk may not be removed. To assist with determining how many extant client keys reference a particular hash, the <hash, NVM location> index may be expanded to include a reference count item and may become a <hash, NVM location, count> index, where the count item may indicate the number of extant, live client keys referencing the hash. Therefore, each time a client key is deleted, the corresponding entry in the <hash, NVM location, count> index may be located through the hash and the count item reduced by 1. Once the count item reduces to 0, the corresponding data chunk stored at the referenced NVM location may be removed. It should be understood by one skilled in the art that a reference count may be maintained in any of a variety of index structures besides the <hash, NVM location> index. In another embodiment, instead of using the reference count item, a garbage collection mechanism that implements a mark-and-sweep process may be utilized periodically to cross-compare the <hash, NVM location> index with the <client key, hash> index to find the entr(ies) in the <hash, NVM location> index whose hash is no longer referenced by any live entry in the <client key, hash> index. Theses <hash, NVM location> entries may be considered dead and the associated data chunks may be safely removed and the space reused for other content. Since the index may exist in DRAM and/or NVM, they can be accessed quickly; therefore, the count items may be updated quickly and may be preferred over the mark-and-sweep approach.

Figure 5:
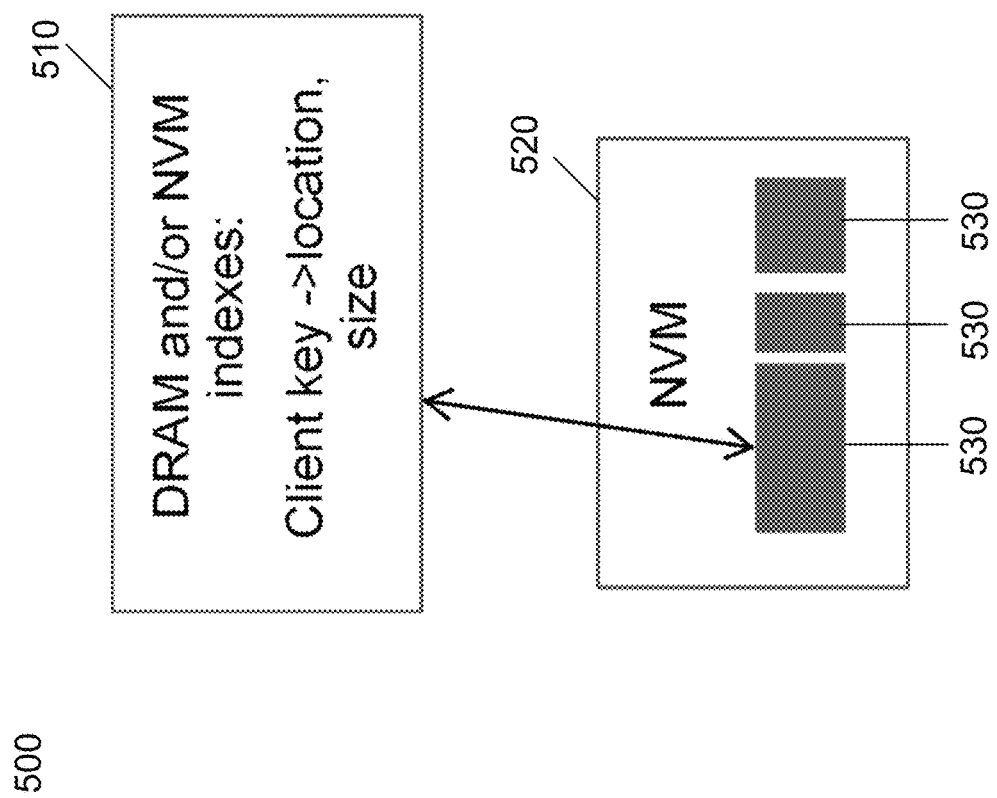
FIG. 5 is a block diagram illustrating various components according to embodiments of the disclosure.

Referring to FIG. 5, a block diagram 500 illustrating various components according to embodiments of the disclosure is shown. When only compression is applied without deduplication, a single <client key, NVM location+size> index 510 may be stored in DRAM and/or NVM. The size item may be required because compressed data chunks may have variable sizes. In one embodiment, variable-sized compressed data chunks 530 may be stored in NVM 520. Compression techniques such as LZ, BZIP, 7ZIP, etc., can be applied to content before or after it is added to an NVM cache without deduplication being applied. In another embodiment, compression may be applied in combination with deduplication. With the compression technique, when content is added to a cache, a compression algorithm may be first applied to shrink the size of the content before it is written to NVM. In embodiments where deduplication is used along with compression, deduplication may be applied before compression, and the indexes are used as shown in Tables 1 and 2 and FIG. 4. If deduplication is not applied, then an index may map directly from a client key (e.g., an LBA, <file handle, offset> pair, databased record ID, etc.) to a NVM location without the need for other indexes, as shown in FIG. 5. A particular compressor (compression algorithm) may be selected based on the amount of available computational resources or expected compression ratio that can be achieved. Compression can be applied inline, as data is inserted into the cache, or it can be applied at a later time with the previous uncompressed data chunk removed.

In embodiments where compression is applied without deduplication, when a client reads data based on a client key, the <client key, NVM location+size> index illustrated in FIG. 5 may be checked and the compressed data chunk may be read from the NVM based on the NVM location and size of the compressed data chunk. A decompression technique may be applied to the read compressed data chunk to restore the original data, which then may be passed onto the client.

Figure 6:
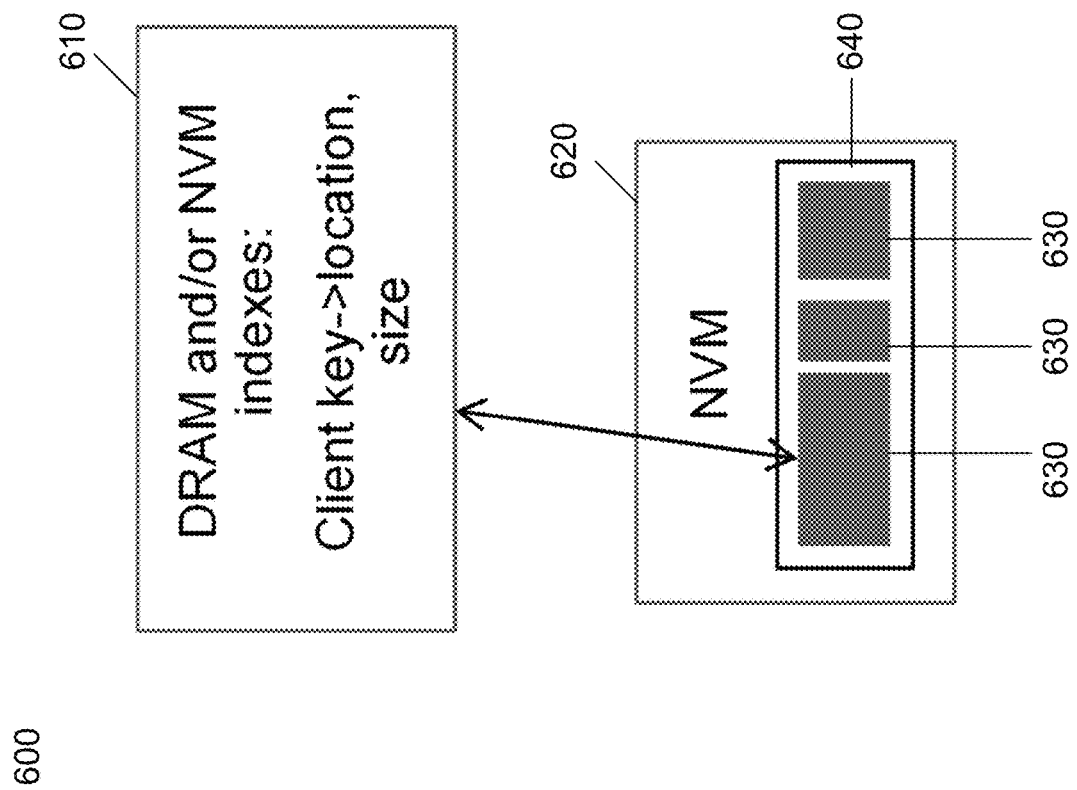
FIG. 6 is a block diagram illustrating various components according to embodiments of the disclosure.

Referring to FIG. 6, a block diagram 600 illustrating various components according to embodiments of the disclosure is shown. When compression is applied without deduplication, a single <client key, NVM location+size> index 610 may be stored in DRAM and/or NVM. The size item may be required because compressed data chunks may have variable sizes. In one embodiment, variable-sized compressed data chunks 630 may be stored in a container 640, which may be stored in NVM 620. When using deduplication without compression, it is possible that the cache may consist of identically sized blocks (e.g., 4 kB). In this case, space management is straightforward, and as blocks are freed, then they can be directly overwritten. When compression is applied, compressed data chunks may be variably sized, so techniques may be needed to manage NVM space efficiently. In particular, deleting a compressed data chunk may create a region that may not match well to what may be needed for a future data chunk. One technique that may be utilized is called log-structured storage, where compressed data chunks are concatenated together into a larger structure with a uniform, fixed size called a container. A container may be multiple megabytes in size. In one embodiment, multiple data chunks may be compressed together to achieve improved compression benefit. Of course, the index structure and the read-back steps may need to be adapted accordingly, as should be apparent to a person skilled in the art. As chunks are deleted from the cache, it may be possible to directly overwrite the free space in a container, or containers may be considered idempotent and not allow partial overwrites. In embodiments where containers are idempotent, a garbage collection process may be implemented to periodically determine whether a container is completely dead or sufficiently dead such that it may make sense to copy live chunks from a (partially) dead container into a new container with the index entries updated and to free the space occupied by the (almost) dead container. When an entire contained is erased at a time, a large fixed sized region may become available for new content (e.g., a new container). An index may be needed that tracks free space in a cache as well as within containers, if containers are used. While log-structured storage is widely used in HDDs and flash devices, it may not be necessary in NVM because NVM allows byte-sized writes, while block devices have a minimum write size of 512 bytes (B) or larger. Containers may still offer the advantages of reducing fragmentation in storage devices (e.g. NVM).

Figure 7:
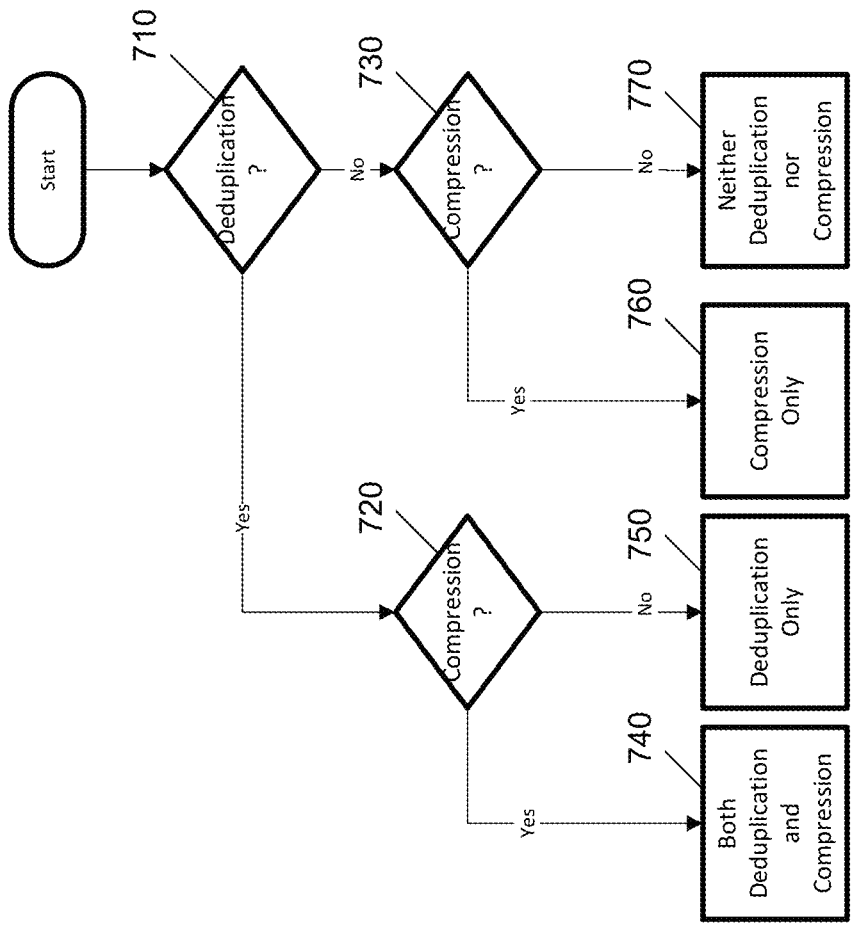
FIG. 7 is a flowchart illustrating an example for determining whether to apply deduplication and/or compression techniques with a NVM cache.

Referring to FIG. 7, a flowchart illustrating an example method 700 for determining whether to apply deduplication and/or compression techniques with a NVM cache is shown. At decision block 710, it may be determined whether the deduplication technique is to be applied with the NVM cache. If the answer is yes at block 710, it may be determined at block 720 whether the compression technique is to be applied. If the answer is yes at block 720, both deduplication and compression techniques are applied at block 740. If the answer is no at block 720, only the deduplication technique is applied at block 750. On the other hand, if the answer is no at block 710, it may be determined at block 730 whether the compression technique is to be applied. If the answer is yes at block 730, only the compression technique is applied at block 760. If the answer is no at block 730, neither deduplication nor compression technique is applied at block 770.

NVM is fast enough that the indexes could be stored in NVM as compared to the slow indexing problems with HDD or even flash. It may be reasonable to keep reference counts in NVM, while it is not reasonable in flash because of the limited lifespan or HDD because of the slow update latency. Some versions of NVM technologies do not have the limited-lifetime problem of flash, so it is possible to rearrange data in NVM without the lifetime concern. For these reasons, post-process deduplication and compression may be more reasonable than in other storage media. Even applying one type of compression and a more aggressive form later is possible. To make writes to NVM persistent, CPU flushing commands may be necessary, which is not the case for flash, and these commands are relatively slow. It may be advantageous to issue a flush periodically and preserve temporarily unprotected content in battery-backed DRAM or delay acknowledgements to the clients. Containers can be created by concatenating data directly in NVM, unlike known techniques that create a container in DRAM before writing to flash or HDD. This is because NVM supports small updates (e.g., byte-sized writes).

Methods 300, 700 may be performed by processing logic that includes hardware (e.g. circuitry, dedicated logic, etc.), software (e.g., embodied on a non-transitory computer readable medium), or a combination thereof. For example, methods 300, 700 may be performed by processors 1501 of FIG. 8. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to the embodiments of the disclosure herein, deduplication and/or compression may be applied to data stored or to be stored in a NVM cache. These techniques may increase the effective capacity of the NVM cache, thus enabling further performance improvements without requiring a further investment in additional NVM cache space.

Figure 8:
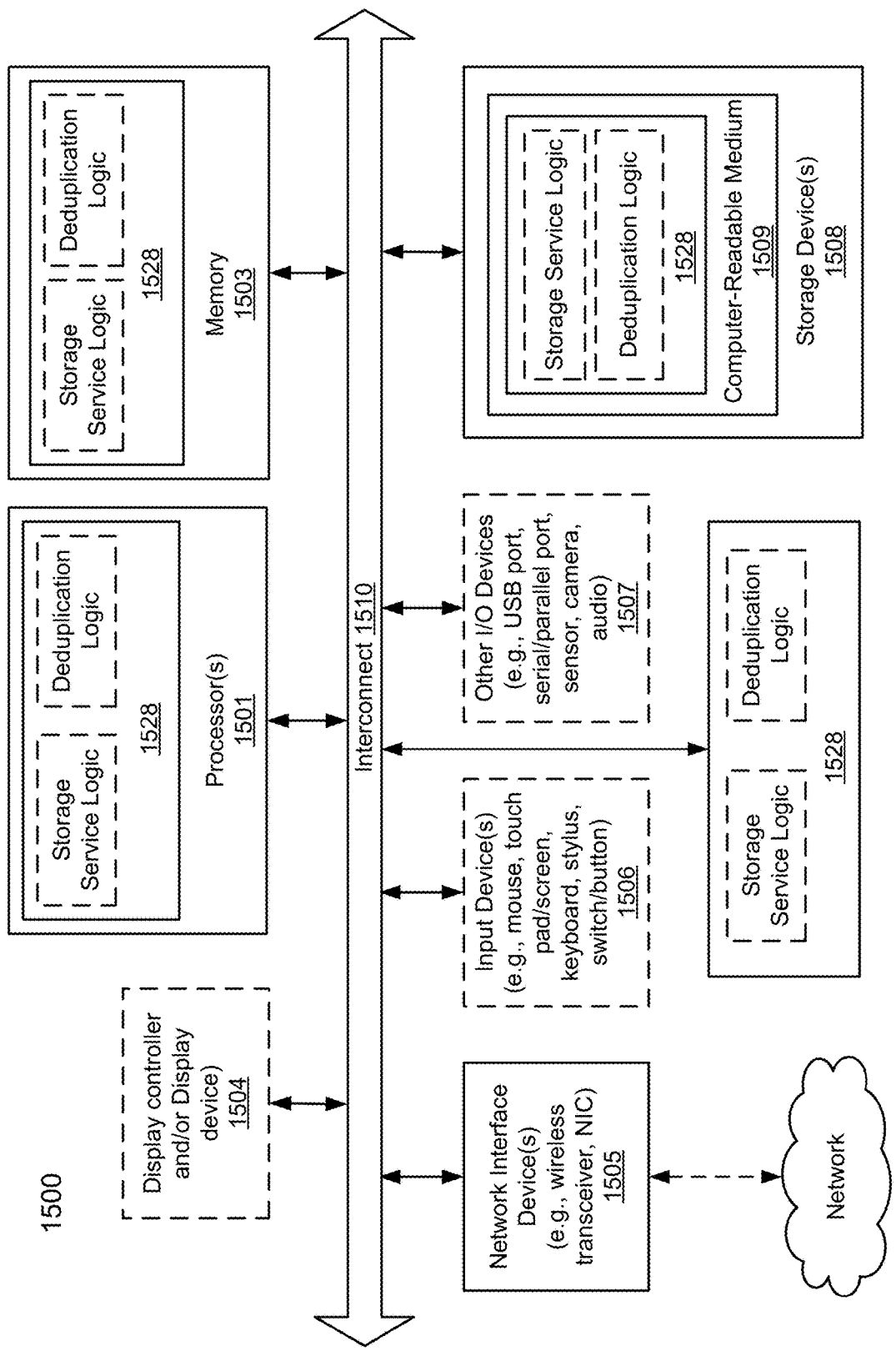
FIG. 8 is a block diagram illustrating an example of a data processing system which may be used with one embodiment of the disclosure.

FIG. 8 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the disclosure.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for applying deduplication, compression, or both, to data stored or to be stored at a non-volatile memory (NVM) cache, comprising:
   identifying the NVM cache;
   determining whether deduplication or compression, or both, is to be applied to data stored or to be stored at the NVM cache; and
   applying either deduplication or compression, or both, to the data stored or to be stored at the NVM cache,
   wherein containers are created by concatenating data directly in the NVM cache without first creating the containers in a dynamic random access memory (DRAM) when compression is applied,
   wherein whether data sections are identical is determined based on cryptographic hashes when deduplication is applied, wherein in response to deduplication being applied, a first index and a second index are maintained in the NVM cache to map client keys to locations of the NVM cache, the first index mapping client keys to hashes, the second index mapping the hashes to locations of the NVM cache and including, in each entry comprising a hash-NVM cache location pair, a reference count indicative of a quantity of live client keys referencing the respective hash, wherein when a reference count reaches zero, NVM cache space associated with the respective NVM cache location is recovered for future reuse, wherein in response to deduplication not being applied, a third index is maintained to map client keys directly to locations of the NVM cache without use of hashes, each entry of the third index including a size of a corresponding data chunk, and
   wherein based on a level of system computational loads at a time of data storage, deduplication, compression, or both, are applied either inline as the data is being written to the NVM cache or at a later time after the data has been written to the NVM cache.

2. The method of claim 1, wherein deduplication, compression, or both, are applied inline as the data is being written to the NVM cache.

3. The method of claim 1, wherein deduplication, compression, or both, are applied after the data has been written to the NVM cache.

4. The method of claim 1, wherein deduplication is applied, and wherein whether data sections are identical is determined using byte-by-byte comparison.

5. The method of claim 1, wherein compression is applied, and wherein log-structured storage is used to manage space of the NVM cache.

6. The method of claim 1, wherein both deduplication and compression are applied, and deduplication is applied before compression.

7. A data processing system, comprising:
   a processor; and
   a memory coupled to the processor storing instructions which, when executed by the processor, cause the processor to perform testing operations, the operations including
   identifying the NVM cache;
   determining whether deduplication or compression, or both, is to be applied to data stored or to be stored at the NVM cache; and
   applying either deduplication or compression, or both, to the data stored or to be stored at the NVM cache,
   wherein containers are created by concatenating data directly in the NVM cache without first creating the containers in a dynamic random access memory (DRAM) when compression is applied,
   wherein whether data sections are identical is determined based on cryptographic hashes when deduplication is applied, wherein in response to deduplication being applied, a first index and a second index are maintained in the NVM cache to map client keys to locations of the NVM cache, the first index mapping client keys to hashes, the second index mapping the hashes to locations of the NVM cache and including, in each entry comprising a hash-NVM cache location pair, a reference count indicative of a quantity of live client keys referencing the respective hash, wherein when a reference count reaches zero, NVM cache space associated with the respective NVM cache location is recovered for future reuse, wherein in response to deduplication not being applied, a third index is maintained to map client keys directly to locations of the NVM cache without use of hashes, each entry of the third index including a size of a corresponding data chunk, and
   wherein based on a level of system computational loads at a time of data storage, deduplication, compression, or both, are applied either inline as the data is being written to the NVM cache or at a later time after the data has been written to the NVM cache.

8. The data processing system of claim 7, wherein deduplication, compression, or both, are applied inline as the data is being written to the NVM cache.

9. The data processing system of claim 7, wherein deduplication, compression, or both, are applied after the data has been written to the NVM cache.

10. The data processing system of claim 7, wherein deduplication is applied, and wherein whether data sections are identical is determined using byte-by-byte comparison.

11. The data processing system of claim 7, wherein compression is applied, and wherein log-structured storage is used to manage space of the NVM cache.

12. The data processing system of claim 7, wherein both deduplication and compression are applied, and deduplication is applied before compression.

13. A non-transitory machine-readable medium having instructions stored therein which, when executed by a processor, cause the processor to perform testing operations, the operations comprising:
   identifying the NVM cache;
   determining whether deduplication or compression, or both, is to be applied to data stored or to be stored at the NVM cache; and
   applying either deduplication or compression, or both, to the data stored or to be stored at the NVM cache,
   wherein containers are created by concatenating data directly in the NVM cache without first creating the containers in a dynamic random access memory (DRAM) when compression is applied, wherein whether data sections are identical is determined based on cryptographic hashes when deduplication is applied, wherein in response to deduplication being applied, a first index and a second index are maintained in the NVM cache to map client keys to locations of the NVM cache, the first index mapping client keys to hashes, the second index mapping the hashes to locations of the NVM cache and including, in each entry comprising a hash-NVM cache location pair, a reference count indicative of a quantity of live client keys referencing the respective hash, wherein when a reference count reaches zero, NVM cache space associated with the respective NVM cache location is recovered for future reuse, wherein in response to deduplication not being applied, a third index is maintained to map client keys directly to locations of the NVM cache without use of hashes, each entry of the third index including a size of a corresponding data chunk, and wherein based on a level of system computational loads at a time of data storage, deduplication, compression, or both, are applied either inline as the data is being written to the NVM cache or at a later time after the data has been written to the NVM cache.

14. The non-transitory machine-readable medium of claim 13, wherein deduplication, compression, or both, are applied inline as the data is being written to the NVM cache.

15. The non-transitory machine-readable medium of claim 13, wherein deduplication, compression, or both, are applied after the data has been written to the NVM cache.

16. The non-transitory machine-readable medium of claim 13, wherein deduplication is applied, and wherein whether data sections are identical is determined using byte-by-byte comparison.

17. The non-transitory machine-readable medium of claim 13, wherein compression is applied, and wherein log-structured storage is used to manage space of the NVM cache.

18. The non-transitory machine-readable medium of claim 13, wherein both deduplication and compression are applied, and deduplication is applied before compression.

* * * * *